Feb. 21, 1967  D. W. CHAMBERLIN  3,305,074
FRUIT PROCESSING MACHINE
Filed Dec. 27, 1963  3 Sheets-Sheet 1
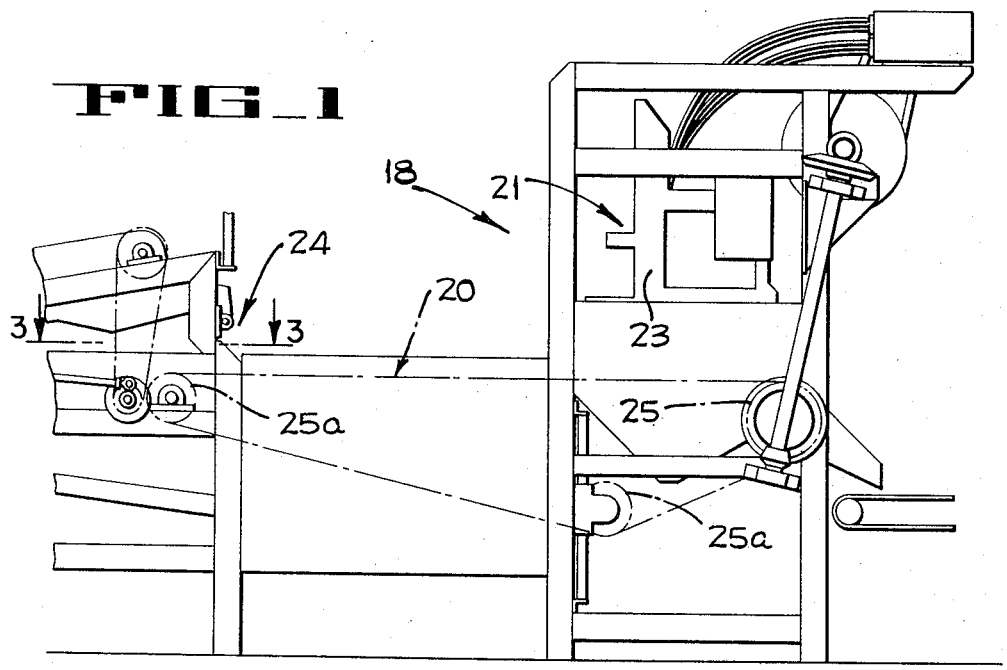
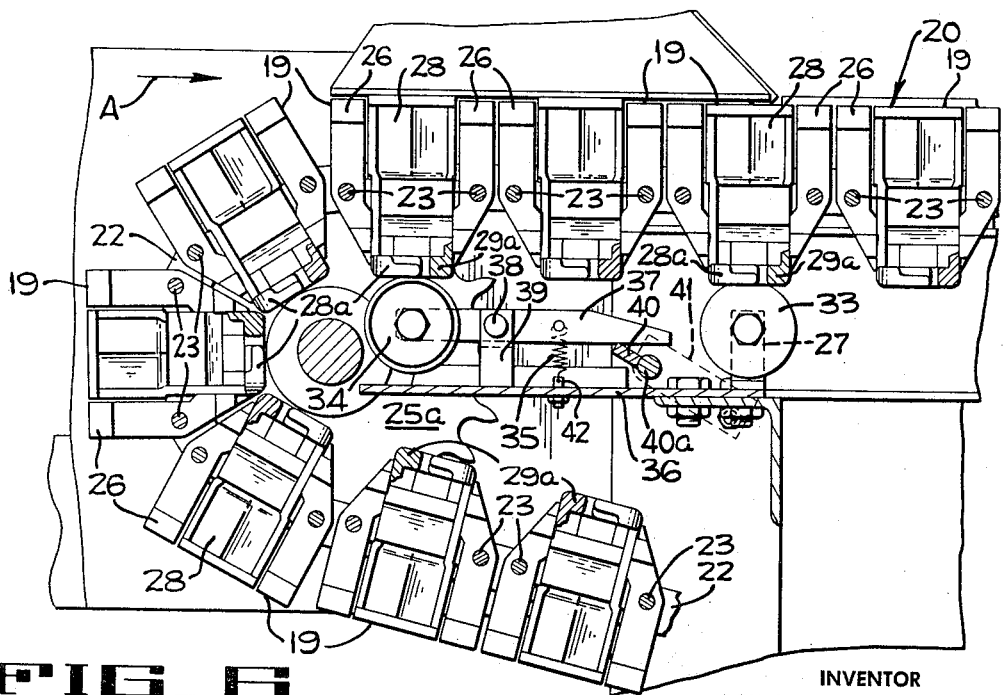
INVENTOR
DONALD W. CHAMBERLIN
BY Hans G. Hoffmeister
ATTORNEY Feb. 21, 1967
D. W. CHAMBERLIN
3,305,074
FRUIT PROCESSING MACHINE
Filed Dec. 27, 1963
3 Sheets-Sheet 2
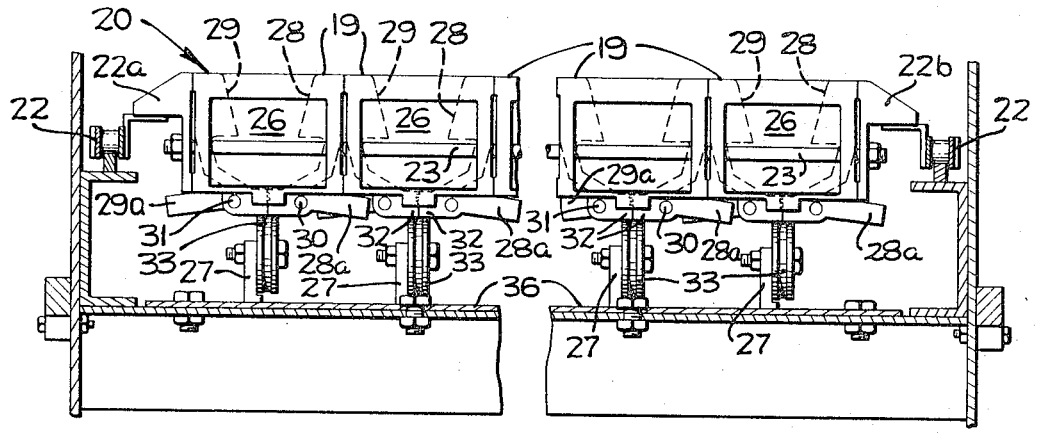
FIG_5
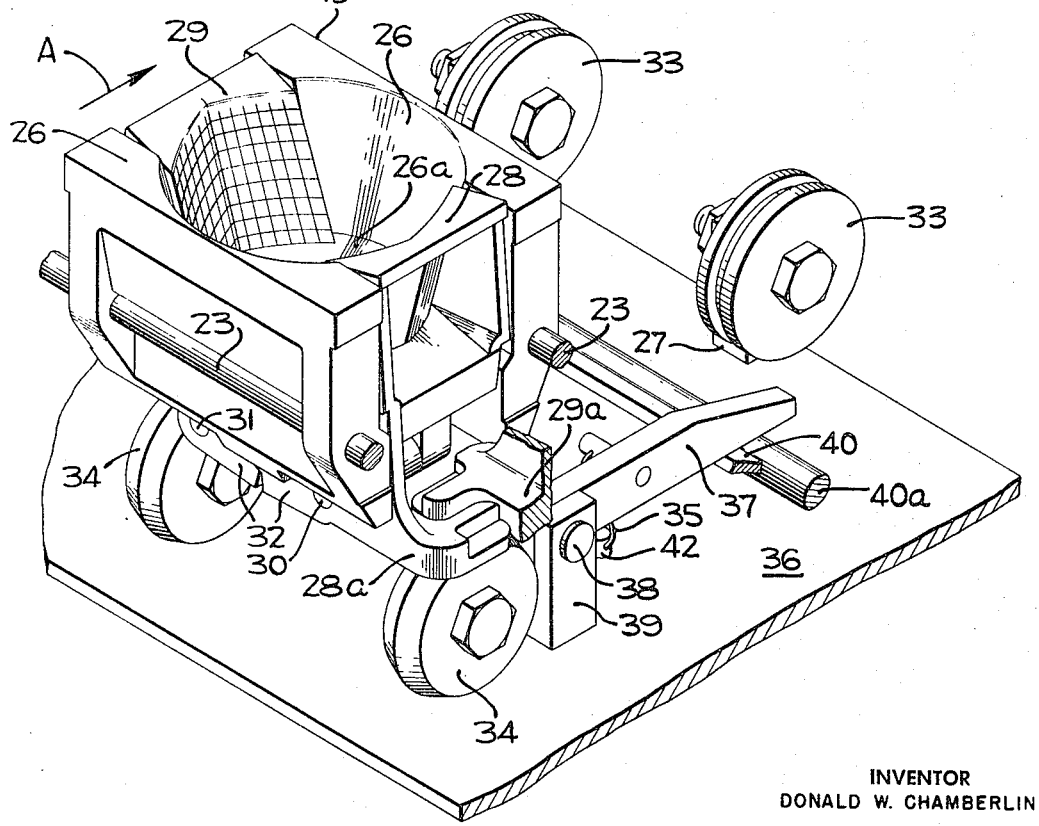
FIG_2
INVENTOR
DONALD W. CHAMBERLIN
BY Hans G. Hoffmeister
ATTORNEY

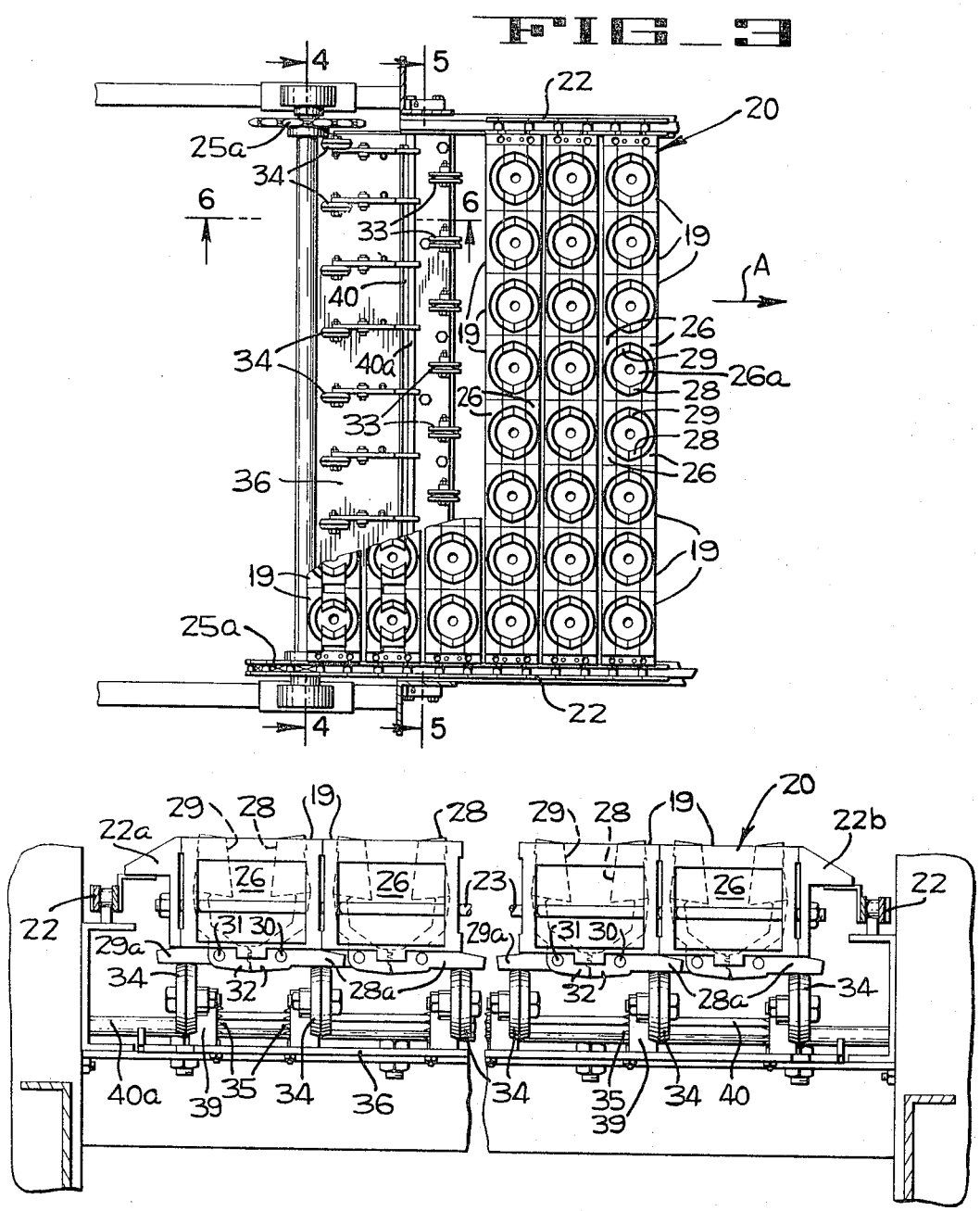

United States Patent Office 3,305,074
Patented Feb. 21, 1967

3,305,074
FRUIT PROCESSING MACHINE
Donald W. Chamberlin, Los Gatos, Calif., assignor to FMC Corporation, San Jose, Calif., a corporation of Delaware
Filed Dec. 27, 1963, Ser. No. 333,954
5 Claims. (Cl. 198—131)

The present invention pertains to fruit processing machines and more particularly to an improved means for orienting pears and other fruit on a conveyor flight.

In the machine processing of fruit, certain operations require individual attention for each piece of fruit. The removal of the core from a pear, for example, requires the pear to be held in accurate vertical orientation as it passes under the coring apparatus. Orientation is achieved in a typical machine by the use of a conveyor having individual pockets into which pears are dropped. The conventional technique has been to drop the pears upside down into a row of pocket-forming cups that subsequently contract their sides to move the pears into vertical positions. The problem has been that the pears tend to bounce upon landing in the cups and to come to rest in a misaligned position beyond the ability of the aligning cups to subsequently move them to vertical position. Consequently, an attendant is required to supervise the conveyor to correct any pears not properly placed. The inefficiency of human handling is increased by the character of the pears. Prior to coring they are treated chemically and brushed to remove the skins. This makes them slippery and hard to manipulate.

One approach to this problem has been to arrange for the conveyor to have its cups closed prior to the dropping of the pears. The theory was that the falling pear would separate the movable jaws of its cup and come to rest in a vertical position. Excessive opening of the jaws would be prevented by the friction between the parts of the cup. Further downstream the jaws would open to allow the pear to seat itself at the bottom of the cup. It was found, however, that the friction was not sufficient to prevent pear bouncing and excessive misalignment.

Therefore, one object of the present invention is to provide a conveyor pocket that catches fruit in a vertically aligned position More specifically, it is an object to provide means for cushioning the fall of fruit into the conveyor pockets, thereby reducing bounce of the fruit upon entering the cups. By reducing the bounce, the vertical orientation of the following fruit is maintained in the pockets.

Another object of this invention is to provide a means for holding the contractible sides of an aligning cup snugly against the fruit that is dropped into it.

Another object of this invention is to provide a means for contracting the sides of an aligning cup and then release the sides further downstream.

Another object is to provide a cup-contracting means that can be disabled.

Another object is to provide an improved fruit-orienting mechanism for a fruit processing machine.

The means by which these and other objects are realized will be seen by referring to the drawings which depict one embodiment of the invention. In these drawings:

FIGURE 1 is a diagrammatic side elevation of a fruit processing machine showing the path traveled by the conveyor flight, a loading station for the conveyor, and a coring station.

FIGURE 2 is an enlarged perspective of a single cup that is mounted on the conveyor of FIG. 1.

FIGURE 3 is a fragmentary diagrammatic plan of the conveyor, showing the area at the loading station as indicated by arrows 3—3 of FIG. 1, with part of the conveyor broken away to show the closing and opening rollers underneath.

FIGURE 4 is an enlarged fragmentary section taken along line 4—4 of FIG. 3 showing the aligning cups with their jaws in a closed position as they pass over the closing rollers.

FIGURE 5 is an enlarged fragmentary section taken along line 5—5 of FIG. 3 showing the jaws in open position as the cups pass over the opening rollers.

FIGURE 6 is an enlarged section taken along line 6—6 of FIG. 3 showing the cups passing first over the closing rollers and then over opening rollers as the conveyor travels under the loading station.

A typical pear-processing machine 18 with which one embodiment of the pear orienting mechanism of the present invention may be used is illustrated in FIG. 1. Such a machine comprises a coring station 21 where the cores are cut out, a conveyor 20 for carrying pears under the coring mechanism 23 at station 21, and a loading station 24 at which pears are deposited on the conveyor. The machine 18, which is diagrammatically shown in FIG. 1, is fully disclosed in the pending application of Gerald R. Anderson, Serial No. 221,174, filed on September 4, 1962, now Patent No. 3,199,558, issued August 10, 1965, and assigned to the assignee of the present invention. Accordingly, it is to be understood that reference may be had to said Anderson application for a complete disclosure of any mechanism not fully described herein.

Loading is generally accomplished by a multiple chute arrangement, each chute being arranged to drop a pear stem end down into a separate cup of the conveyor. The conveyor consists of a pair of spaced chains 22 (FIG. 3) connected through brackets 22a and 22b to transverse rods 23 which carry an endless array of pockets or cups 19. Each conveyor chain 22 is trained around a suitable drive sprocket 25 and idler sprockets 25a. The loading station 24 and the coring station 21 are usually separated by a distance of several feet to provide room for an operator to inspect the pears.

Each aligning cup 19 (FIG. 2) includes two rigid sides 26 which are connected by an integral lower wall 26a and constitute the basic structure that is carried by the conveyor rods 23. Movable jaws 28, 29 enable the cup to adapt its size to any ordinary pear. The right hand jaw 28 pivots on a pin 30 that is carried by lower wall 26a and has a lever arm 28a extending outwardly to one side of the cup. The left hand jaw 29 pivots on a similar pin 31 and has a lever arm 29a (FIG. 4). In FIG. 2, a part of lever arm 29a for one cup is shown next to lever arm 28a of the adjacent cup to illustrate the overlapping placement of the arms of adjacent cups. The two movable jaws of the cup mate with each other by intermeshing gear teeth located on the end faces of two short arms 32 formed on the bottom of each movable jaw on the side of the jaw opposite the side carrying the lever arm. Any force tending to move one jaw causes the companion jaw to move also.

Opening of the jaws 28 and 29 is accomplished by an upward pressure on the bottom edges of the short arms 32. Closing of the cup is accomplished by upward pressure on the lever arms 28a, 29a. Opening pressure is applied to each cup by means of a roller 33 (FIGS. 5 and 6) mounted on a rigid plate 36 under the conveyor at the junction of the gear segments of that cup.

Closing pressure is applied to the cup by means of resiliently mounted roller 34 (FIGS. 4 and 6) mounted on plate 36 under the conveyor at the point where each lever arm 28a overlaps an adjacent lever arm 29a. As the cups 19 move in the direction of arrow A (FIG. 6) the rollers 34 first apply closing pressure to the leading lever arms 29a, then to the trailing lever arms 28a. The closing roller 34 is urged in an upward direction toward the plane of the lever arms 28a, 29a by a coil spring 35 mounted on the stationary plate 36 and acting through a lever or tension arm 37. The tension arm 37 pivots on a pin 38 which is supported by a block 39. Any contractile force exerted by the spring 35 is translated into an upward force on the wheel 34 which is carried at the end of the tension arm 37. Each cup-opening wheel is rotatably mounted in the bifurcated upper end of a short rigid post 27 that is secured to plate 36 and projects upwardly therefrom. Closing may be prevented by manipulation of a lock-out bar 40 which is secured to a rod 40a that is adjustably held in two spaced fixed brackets 41. When rod 40a is adjusted by rotating it clockwise, the bar 40 pivots all arms 37 counterclockwise and disables all of the arms.

The arrangement of cups to form a typical conveyor is shown in FIGURE 3. The rigid sides 26 are mounted end to end within the same row and back to back between adjoining rows. In each row the movable jaws 28 and 29 are placed back to back. When the cups are opened, the conveyor becomes a relatively smooth surface broken by pockets for enclosing fruit. The direction of travel of the cups 19, as seen in this view, would be from left to right. Therefore it may be seen that the cups 19 first ride over the closing rollers 34 which, as mentioned above, are stationed at positions between adjacent cups in the same row. Subsequently the cups 19 ride over the opening rollers 33 which are stationed directly under the center of each cup in the row. FIGURE 3 shows the cups to the right of the opening rollers 33 in an open position. The cups between the opening rollers 33 and the closing rollers 34 are shown in a closed position. The closed position of the cup is seen better in FIGURE 4 which shows two jaws 28, 29 of each cup inclined toward each other and the closing roller 34 pressing upward on one of the two lever arms 28a, 29a. The open position of a cup is seen in FIGURE 5 which shows the two jaws 28, 29 of each cup fully spread apart and the opening roller 33 pressing up on the junction of the two short arms 32 of that cup.

The spacial relationship between the closing roller 34 and the lever arms 28a, 29a may be seen in FIGURE 6. The direction of motion for the conveyor is from left to right. Therefore it is evident that the two lever arms 28a, 29a shown in the space above the closing roller 34 do not contact the roller 34 simultaneously. The roller 34 contacts first the leading lever arm 29a shown to the right of the roller 34. This lever arm is part of the invisible cup assembly lying closer to the observer than the section line on which the view in FIGURE 6 is taken. The roller 34 next contacts the trailing lever arm 28a which is part of the cup assembly shown by FIGURE 6 in the space above the roller 34. Therefore, during the passage of each row of cups over the array of closing rollers 34, each closing roller operates twice. Since the cup assemblies are interchangeable and since the leading arms 29a and the trailing arms 28a are geared together each cup receives two closing impulses.

The operation of the fruit aligning means is best explained by referring to FIGURE 6. The closing roller 34 is located generally below the dropping station 24. The timing of the closing impulses is synchronized with the arrival of a pear as it falls into its cup. The leading lever arm 29a of each cup contacts the roller 34 shortly before the pears drop. This contact closes the cup which remains closed by reason of the friction between its moving parts. As the pear falls the rollers 34 contact the trailing lever arm 28a of each cup. The impact of the pear tends to separate the jaws 28, 29. The pressure on the jaws 28, 29 tends to move the lever arms 28a downward against the closing roller 34. The resulting downward movement of the roller 34 causes the tension arm 37 to pivot on its pin 38 and stretch the spring 35. The effect is that the tension of the spring 35 tends to keep the jaws 28, 29 from spreading too far apart when they are separated by a pear as it moves downward in the cup. Accordingly, each pear is caught by the spring-loaded jaws and the action of the spring, in yieldingly resisting the opening of the cup, provides a cushion or damping effect which prevents bouncing of the pear. During continued movement of the conveyor, the rollers 33 open the cups to permit the stem-ends of the pears to move or be moved farther down in the cup.

Adjustment of spring tension from each individual roller can be accomplished by turning an adjusting screw 42. If for any reason it is desired to prevent the cups from closing, the lock-out bar 40 may be manipulated to overcome the springs 35 and thereby secure the rollers 34 in a position where they do not contact the lever arms 28a, 29a as the conveyor passes under the dropping station.

From the foregoing description of the structure in operation, it may be seen that the present invention provides a capability that increases substantially the efficiency of fruit processing machines by eliminating the need for further adjustment by an attendant between the loading station 24 and the coring station 21. Dropping fruit into a closed cup is a new concept. Traditionally, fruit has been dropped into open cups on a conveyor and then adjusted by an attendant. The invention described above now makes it possible to align the fruit automatically and thus to a large extent eliminates the necessity for and cost of such attendants.

It is understood, of course, that variations and modifications of the above described embodiment may be effected without departing from the spirit and scope of the present invention which is limited only by the scope and proper interpretation of the appended claims.

Having thus described the invention what is claimed as new and desired to be secured by Letters Patent is:

1. In a fruit processing machine, fruit receiving cup means, means for feeding a fruit into said cup means, said cup means including a set of fruit engaging members mounted for movement toward and away from one another into closed and opened positions, respectively, and means for moving said fruit engaging members into said closed position and for yieldably holding said fruit engaging members in said closed position while said fruit is being fed into said cup means.

2. In a machine for processing produce, such as, fruit, a carrier having a set of jaws, means mounting said jaws for movement toward and away from each other, means positioned above said carrier for feeding the produce into said carrier, and means for resiliently biasing said jaws toward each other as the produce is fed into said carrier whereby said jaws act as a cushion as the produce is received by said carrier.

3. In the machine defined by claim 2 further including means for moving said carrier past said produce feeding means.

4. In a fruit processing machine, a conveyor formed by a plurality of fruit receiving cups, each of said fruit receiving cups having openable and closable jaws, jaw operating lever arms extending from said jaws, a jaw closing member in the path of said conveyor for engaging said lever arms, yieldable means for urging said jaw closing member against said lever arms for resiliently urging said jaws toward each other to close said jaws, and means for dropping a fruit into each of said fruit receiving cups and against said jaws when said jaws are resiliently urged toward each other.

5. In a fruit processing machine, a conveyor, a fruit carrier mounted on said conveyor for movement therewith, said carrier having a pair of opposed pivotally mounted fruit engaging means, means defining a fruit feeding station above a portion of said conveyor, resilient means mounted below the path of movement of said carrier at said feeding station, said resilient means having a member extending into the path of movement of said carrier and said fruit engaging means to be engaged thereby, whereby said resilient means urges said fruit engaging means to a predetermined closed position as said carrier passes through said feeding station and receives a fruit dropped downwardly at said station.

References Cited by the Examiner

UNITED STATES PATENTS

| | | | |
|---|---|---|---|
| 1,019,086 | 3/1912 | Quinn | 198—179 |
| 1,132,713 | 3/1915 | Francisco | 198—179 |
| 2,526,712 | 11/1950 | Thompson | 146—33 |
| 2,938,620 | 5/1960 | Waters | 198—33.1 |
| 2,980,233 | 4/1961 | Puccinelli | 198—131 X |

EVON C. BLUNK, *Primary Examiner.*

SAMUEL F. COLEMAN, *Examiner.*

R. J. HICKEY, *Assistant Examiner.*